US007546623B2

(12) United States Patent
Ramraz et al.

(10) Patent No.: US 7,546,623 B2
(45) Date of Patent: Jun. 9, 2009

(54) METHODS AND SYSTEMS FOR PROVIDING MULTI-SOURCE CONTENT IN ELECTRONIC PROGRAM GUIDES

(75) Inventors: Amit Ramraz, Cupertino, CA (US); Edward M. Tecot, Sunnyvale, CA (US); Shannon C. Hegg, Mountain View, CA (US); Pradip K. Fatehpuria, Cupertino, CA (US); Sanjay Dhanraj Sahgal, Fremont, CA (US); Gabriel Gottlieb, Seattle, WA (US); Anand Muthurajan, Sammamish, WA (US); Joerg Raymond Brown, Livermore, CA (US); Deepa Rajagopal, San Jose, CA (US); Sampathkumar Ramakrishnan, Sunnyvale, CA (US); Stacy L. Yust, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 968 days.

(21) Appl. No.: 11/029,907

(22) Filed: Jan. 5, 2005

(65) Prior Publication Data
US 2006/0150214 A1 Jul. 6, 2006

(51) Int. Cl.
*H04N 5/445* (2006.01)
(52) U.S. Cl. .................... 725/48; 725/49; 348/731; 348/732
(58) Field of Classification Search .............. 725/48, 725/49
See application file for complete search history.

(56) References Cited
U.S. PATENT DOCUMENTS

| 5,182,646 | A | * | 1/1993 | Keenan | 348/732 |
| 5,550,576 | A | * | 8/1996 | Klosterman | 725/49 |
| 5,625,406 | A | * | 4/1997 | Newberry et al. | 725/49 |
| 5,805,230 | A | * | 9/1998 | Staron | 348/732 |
| 5,808,694 | A | * | 9/1998 | Usui et al. | 725/49 |
| 5,982,411 | A | * | 11/1999 | Eyer et al. | 725/49 |
| 6,003,041 | A | * | 12/1999 | Wugofski | 707/104.1 |
| 6,037,877 | A | * | 3/2000 | Matthews | 348/732 |
| 6,137,546 | A | * | 10/2000 | Shintani et al. | 348/731 |
| 6,219,839 | B1 | * | 4/2001 | Sampsell | 725/49 |
| 6,249,320 | B1 | * | 6/2001 | Schneidewend et al. | 725/56 |
| 6,359,580 | B1 | * | 3/2002 | Morrison | 348/731 |
| 6,442,757 | B1 | * | 8/2002 | Hancock et al. | 725/49 |
| 6,529,680 | B1 | * | 3/2003 | Broberg | 725/49 |
| 6,707,508 | B1 | * | 3/2004 | Mears et al. | 348/731 |
| 6,734,804 | B1 | * | 5/2004 | Lee | 348/731 |
| 6,833,878 | B2 | * | 12/2004 | Takagi et al. | 348/731 |
| 7,100,186 | B1 | * | 8/2006 | Minakawa et al. | 725/49 |
| 7,444,661 | B1 | * | 10/2008 | Wugofski | 725/49 |
| 2002/0010919 | A1 | * | 1/2002 | Lu et al. | 725/14 |
| 2002/0054062 | A1 | * | 5/2002 | Gerba et al. | 345/716 |
| 2002/0089603 | A1 | * | 7/2002 | Onomatsu | 348/731 |
| 2004/0158874 | A1 | * | 8/2004 | Ono et al. | 348/731 |
| 2005/0100053 | A1 | * | 5/2005 | Kang | 725/135 |
| 2006/0037060 | A1 | * | 2/2006 | Simms et al. | 725/116 |
| 2007/0067803 | A1 | * | 3/2007 | Mears et al. | 725/52 |

* cited by examiner

*Primary Examiner*—Brian T Pendleton
*Assistant Examiner*—Fernando Alcon
(74) *Attorney, Agent, or Firm*—Lee & Hayes, PLLC

(57) ABSTRACT

Various embodiments pertain to methods and systems for providing multi-source content in electronic program guides (EPGs). In at least some embodiments, various techniques can present the viewer with a user interface, such as a grid, that is efficiently and intelligently assembled and managed to foster a desirable user experience.

19 Claims, 8 Drawing Sheets

| Channel | 12:00 | 12:30 | 1:00 |
|---|---|---|---|
| 2 NBC (Ant) | | | |
| 2 NBC (Sat) | | | |
| 3 ABC (Ant) | | | |
| 3 ABC (Sat) | | | |
| 4 KRON (Ant) | | | |
| 4 KQED (Sat) | | | |

1100

| Channel | Input |
|---|---|
| 2 NBC | Antenna |
| 2 NBC | Satellite |
| 3 ABC | Antenna |
| 3 ABC | Satellite |
| 4 KRON | Antenna |
| 4 KQED | Satellite |

| Channel | 12:00 | 12:30 | 1:00 |
|---|---|---|---|
| 2 NBC (Ant) | | | |
| 2 NBC (Sat) | | | |
| 3 ABC (Ant) | | | |
| 3 ABC (Sat) | | | |
| ⋮ | | | |
| Video 1 | | | |
| Video 2 | | | |

Fig. 12

METHODS AND SYSTEMS FOR PROVIDING MULTI-SOURCE CONTENT IN ELECTRONIC PROGRAM GUIDES

TECHNICAL FIELD

This invention relates to entertainment systems and related methods and, in particular, to systems and methods that utilize electronic program guides (EPGs).

BACKGROUND

In its simplest form, the electronic program guide (EPG) is an application used by television viewers to browse for programs and change channels. That is, the EPG is a core application for television viewing that enables the viewer to determine what programs or services are available to them at a specific time and on a specific channel.

In many homes, viewers may be receiving multiple sources of television content simultaneously. Some of these sources include, without limitation, antenna sources, cable sources and satellite sources.

These multiple sources of content continue to present challenges in terms of incorporating these multiple different sources and presenting a viewable and conveniently navigable user interface (e.g. an EPG grid) that provides a desirable and efficient user experience.

SUMMARY

Various embodiments pertain to methods and systems for providing multi-source content in electronic program guides (EPGs). In at least some embodiments, various techniques can present the viewer with a user interface, such as a grid, that is efficiently and intelligently assembled and managed to foster a desirable user experience.

In at least one embodiment, multiple sources can be merged in an intelligent way and presented in one user interface. The merging of the sources is performed in a manner that is directed to removing duplication, such as in the case of sources of the same providers (e.g. analog cable and digital cable). In addition, in some embodiments, the source of content in the EPG is presented to help the viewer better understand the information that is presented on their screen.

In addition, various embodiments can enable a viewer to intelligently browse different channels while watching live television in a way that skips duplicate channels on different sources. Moreover, an intelligent tuning algorithm facilitates faster tuning so that content can be acquired by the viewer in a more expedient fashion.

Further embodiments can provide a default lineup system that enables the user to browse multiple sources of media without EPG information.

Still further embodiments support scheduling and/or recording in various homogeneous and heterogeneous tuner environments.

BRIEF DESCRIPTION OF THE DRAWINGS

FIG. 11 illustrates an exemplary channel filtering user interface in accordance with one embodiment.

FIG. 12 illustrates an exemplary electronic program guide in accordance with one embodiment.

DETAILED DESCRIPTION

Overview

Figure 1:
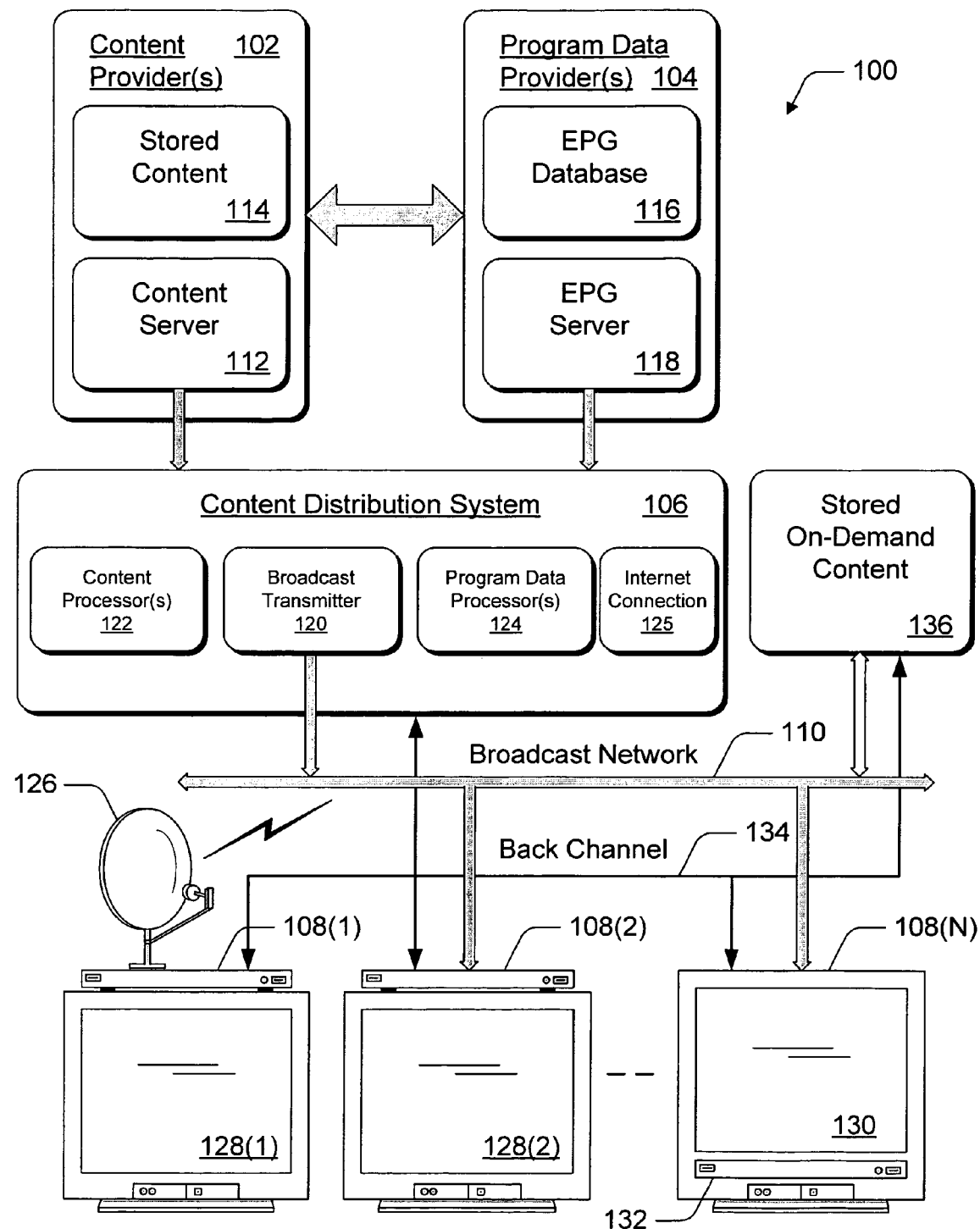
FIG. 1 is a block diagram that illustrates an exemplary entertainment system comprising an architecture in which the various inventive techniques can be implemented in accordance with one embodiment.

Various embodiments pertain to methods and systems for providing multi-source content in electronic program guides (EPGs). In at least some embodiments, various techniques can present the viewer with a user interface, such as a grid, that is efficiently and intelligently assembled and managed to foster a desirable user experience.

In at least one embodiment, multiple sources can be merged in an intelligent way and presented in one user interface. The merging of the sources is performed in a manner that is directed to removing duplication, such as in the case of sources of the same providers (e.g. analog cable and digital cable). In addition, in some embodiments, the source of content in the EPG is presented to help the viewer better understand the information that is presented on their screen.

In addition, various embodiments can enable a viewer to intelligently browse different channels while watching live television in a way that skips duplicate channels on different sources. Moreover, an intelligent tuning algorithm facilitates faster tuning so that content can be acquired by the viewer in a more expedient fashion.

Further embodiments can provide a default lineup system that enables the user to browse multiple sources of media without EPG information.

Still further embodiments support scheduling and/or recording in various homogeneous and heterogeneous tuner environments.

Terminology Utilized in This Document

Before embarking on a discussion of the various inventive embodiments, the following terminology will be used throughout this document.

A source (unqualified) refers to the source of a particular signal that is received by, for example, a client device. Sources can include, without limitation, analog cable, digital cable, satellite, antenna, camcorders, VCRs, digital camera and the like.

An input refers to the type of video signal interface on a client device. Examples of inputs include, without limitation, composite input, S-Video input, RF input and the like.

A tuner refers to the component(s) that enable a viewer to have their system tune to a particular channel. Various entertainment systems can have one or more tuners. Each tuner typically has multiple inputs.

A provider can refer to different contexts. For example, a content provider refers to a content source. Examples of content sources include, without limitation, Comcast and DirectTV. An EPG listing provider or program data provider refers to a guide data source such as, for example, Windows Media® Information Source.

A service refers to specific content that is delivered by a content provider over a transition media on a specific channel. In one aspect, a service can be considered as a time-oriented collection of programs organized in a fashion that is perceived by most as a channel. Individual services typically correspond to one row of an EPG grid. Examples of services include, without limitation, channel 4, Pay Per View (PPV), NBC, ESPN and the like.

An electronic program guide or EPG refers to a particular type of user interface that is provided by an EPG application and presented to a viewer. One type of electronic program guide comprises a grid having multiple rows, each of which is associated with a service, and multiple columns each of which can be associated with a time slot.

A lineup is a set of services that are provided by a specific content provider. A lineup is presented to a viewer via an electronic program guide and, when in the form of a grid, typically corresponds to multiple rows of the grid.

A homogeneous configuration refers to a tuner configuration in which all tuners have the same set of services—the same lineup.

A heterogeneous configuration refers to a tuner configuration in which all tuners are not connected to the same sources.

Exemplary System Architecture

FIG. 1 illustrates an exemplary television entertainment system 100 comprising an architecture in which the various techniques described below can be implemented. System 100 facilitates distribution of content and program data to multiple viewers, and includes one or more content providers 102, one or more program data providers 104, a content distribution system 106, and multiple client devices 108(1), 108(2), ..., 108(N) coupled to the content distribution system 106 via a broadcast network 110. It is to be appreciated and understood that the exemplary system described below constitutes but one exemplary operating environment. Accordingly, this description is not intended to limit application of the claimed subject matter to just this one type of operating environment. Rather, the inventive principles described herein can be implemented in other similar or different environments without departing from the spirit and scope of the claimed subject matter.

Content provider 102 includes a content server 112 and stored content 114, such as television programs, movies, commercials, music, and similar audio and/or video content. Content server 112 controls distribution of the stored content 114 from content provider 102 to the content distribution system 106. Additionally, content server 112 controls distribution of live content (e.g., content that was not previously stored, such as live feeds) and/or content stored at other locations to the content distribution system 106. Program data provider 104 includes an electronic program guide (EPG) database 116 and an EPG server 118. The EPG database 116 stores electronic files of program data and is used to generate an electronic program guide (or, "program guide"). Program data (or, "EPG data") includes program titles, ratings, characters, descriptions, actor names, station identifiers, channel identifiers, schedule information, and so on.

The EPG server 118 processes the program data prior to distribution to generate a published version of the program data which contains programming information for all channels for one or more days. The processing may involve any number of techniques to reduce, modify, or enhance the program data. Such processes might include selection of content, content compression, format modification, and the like. The EPG server 118 controls distribution of the published version of the program data from program data provider 104 to the content distribution system 106 using, for example, a file transfer protocol (FTP) over a TCP/IP network (e.g., Internet or an Intranet). Further, the published version of the program data can be transmitted from program data provider 104 via a satellite directly to a client device 108 and/or via the Internet, as will be appreciated by the skilled artisan.

Content distribution system 106 includes a broadcast transmitter 120, one or more content processors 122, one or more program data processors 124 and, in at least some embodiments, one or more Internet connections 125. It is to be appreciated and understood that content distribution system can, in at least some embodiments, constitute a logical collection of entities that distribute content. For purposes of explanation, these entities are logically grouped together. Broadcast transmitter 120 broadcasts signals, such as cable television signals, across broadcast network 110. Broadcast network 110 can include a cable television network, RF, microwave, satellite, and/or data network, such as the Internet, and may also include wired or wireless media using any broadcast format or broadcast protocol. Additionally, broadcast network 110 can be any type of network, using any type of network topology and any network communication protocol, and can be represented or otherwise implemented as a combination of two or more networks. In at least some embodiments, at least portions of the broadcast network comprise the Internet.

A content processor 122 processes the content received from content provider 102 prior to transmitting the content across broadcast network 110. Similarly, a program data processor 124 processes the program data received from program data provider 104 prior to transmitting the program data across broadcast network 110. A particular content processor 122 may encode, or otherwise process, the received content into a format that is understood by the multiple client devices 108(1), 108(2), ..., 108(N) coupled to broadcast network 110. Although FIG. 1 shows a single content provider 102, a single program data provider 104, and a single content distribution system 106, exemplary system 100 can include any number of content providers and/or program data providers coupled to any number of content distribution systems.

Content distribution system 106 is representative of a headend service, or network operator, which provides EPG data, as well as content, to multiple subscribers. Each content distribution system 106 may receive a slightly different version of the program data that takes into account different programming preferences and lineups. The EPG server 118 creates different versions of EPG data (e.g., different versions of a program guide) that include those channels of relevance to respective headend services, and the content distribution system 106 transmits the EPG data to the multiple client devices 108(1), 108(2), ..., 108(N). In one implementation, for example, content distribution system 106 utilizes a carousel file system to repeatedly broadcast the EPG data over an out-of-band (OOB) channel to the client devices 108.

Client devices 108 can be implemented in a number of ways. For example, a client device 108(1) receives broadcast content from a satellite-based transmitter via a satellite dish 126. Client device 108(1) is also referred to as a set-top box or a satellite receiving device. Client device 108(1) is coupled to a television 128(1) for presenting the content received by the client device (e.g., audio data and video data), as well as a graphical user interface. A particular client device 108 can be coupled to any number of televisions 128 and/or similar devices that can be implemented to display or otherwise render content. Similarly, any number of client devices 108 can be coupled to a single television 128.

Client device 108(2) is also coupled to receive broadcast content from broadcast network 110 and provide the received content to associated television 128(2). Client device 108(N) is an example of a combination television 130 and integrated set-top box 132. In this example, the various components and functionality of the set-top box are integrated into the television, rather than using two separate devices. The set-top box integrated into the television can receive broadcast signals via a satellite dish (similar to satellite dish 126) and/or via broadcast network 110. In alternate implementations, client devices 108 may receive broadcast signals via the Internet or any other broadcast medium, such as back channel 134 which can be implemented as an Internet protocol (IP) connection using a modem connection and conventional telephone line, for example. Further, back channel 134 provides an alternate communication link between each of the client devices 108, and between the client devices 108 and the content distribution system 106.

In addition, any of the client devices can be connected to multiple different sources, such as those mentioned above in the "Terminology" section.

Each client device 108 can run an electronic program guide (EPG) application that utilizes the program data. An EPG application enables a television viewer to navigate through an onscreen program guide and locate television shows and other broadcast content of interest to the viewer. With an EPG application, the television viewer can look at schedules of current and future programming, set reminders for upcoming programs, and/or enter instructions to record one or more television shows.

The exemplary system 100 can also include stored on-demand content 136, such as video on-demand (VOD) movie content. The stored on-demand content 136 can be viewed with a television 128 via a client device 108 through an onscreen movie guide, for example, and a viewer can enter instructions to stream a particular movie, or other stored content, down to a corresponding client device 108.

Exemplary Client Device

Figure 2:
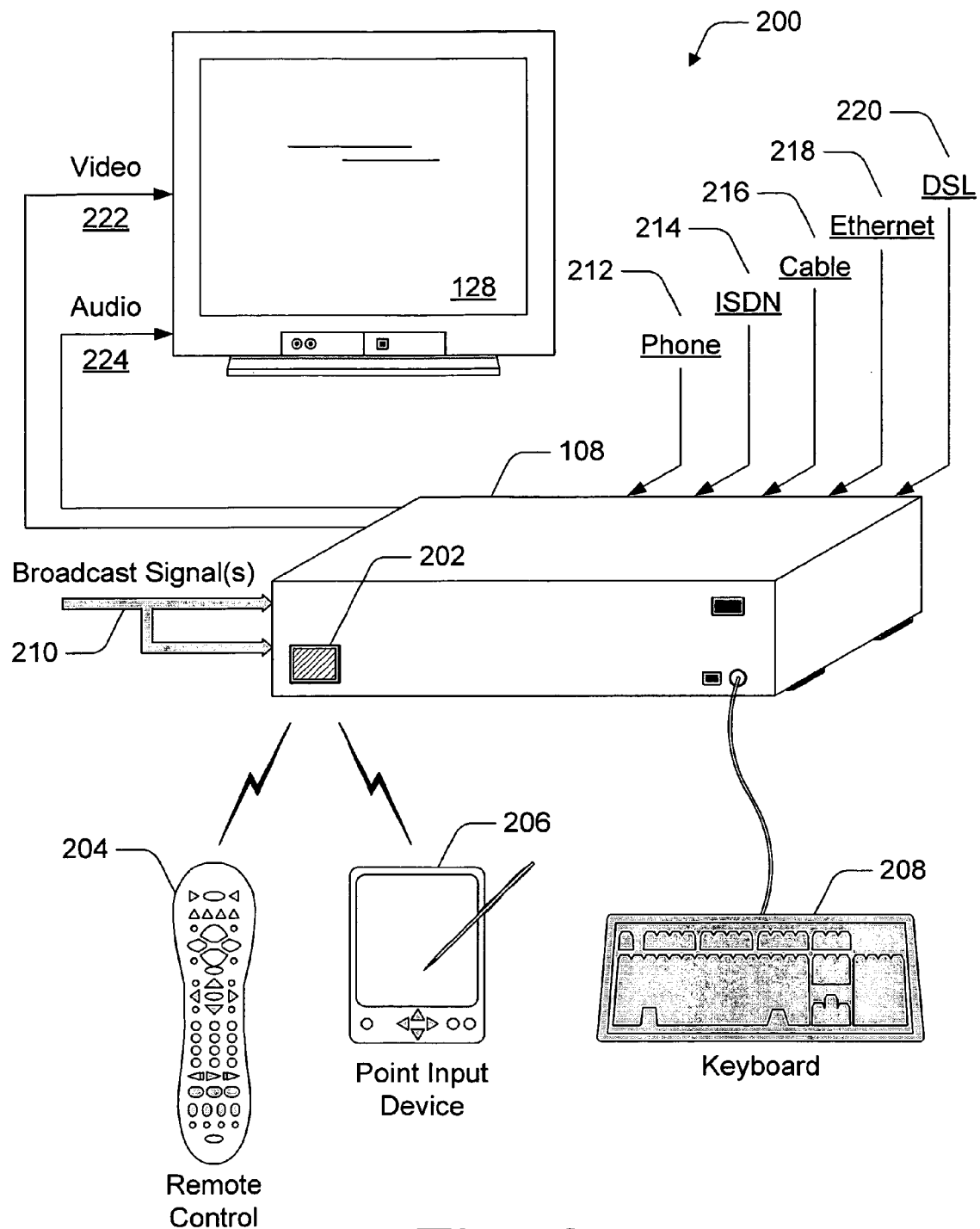
FIG. 2 illustrates an exemplary implementation of a client device that can be utilized to implement the various inventive techniques in accordance with one embodiment.

FIG. 2 illustrates an exemplary implementation 200 of a client device 108 shown as a standalone unit that connects to a television 128. Client device 108 can be implemented in any number of embodiments, including as a set-top box, a satellite receiver, a TV recorder with a hard disk, a digital video recorder (DVR) and playback system, a game console, an information appliance, and so forth.

Client device 108 includes, in this example, a wireless port 202, such as an infrared (IR) or Bluetooth wireless port, for receiving wireless communications from a remote control device 204, a handheld input device 206, or any other wireless device, such as a wireless keyboard. Handheld input device 206 can be a personal digital assistant (PDA), handheld computer, wireless phone, or the like. Additionally, a wired keyboard 208 can be coupled to communicate with client device 108. In alternate embodiments, remote control device 204, handheld device 206, and/or keyboard 208 may use an RF communication link or other mode of transmission to communicate with client device 108.

Client device 108 receives one or more broadcast signals 210 from one or more broadcast sources, such as from a satellite, antenna, or from a broadcast network, such as broadcast network 110 (FIG. 1). Client device 108 includes hardware and/or software for receiving and decoding broadcast signal 210, such as an NTSC, PAL, SECAM, or other TV system video signal. Client device 108 also includes hardware and/or software for providing the user with a graphical user interface by which the user can, for example, access various network services, configure the client device 108, and perform other functions.

Client device 108 can communicate with other devices, such as content provider(s) 102, via one or more connections including a conventional telephone line 212, an ISDN link 214, a cable link 216, an Ethernet link 218, a DSL link 220, and the like. Client device 108 may use any one or more of the various communication links 212-220 at a particular instant to communicate with any number of other devices, such as other client devices distributed about the home, and can use these communication links to share data, programs and other resources with these other devices.

Client device 108 generates video signal(s) 222 and audio signal(s) 224, both of which are communicated to television 128. The video signals and audio signals can be communicated from client device 108 to television 128 via an RF (radio frequency) link, S-video link, composite video link, component video link, or other communication link. Although not shown in FIG. 2, client device 108 may include one or more lights or other indicators identifying the current status of the device. Additionally, the client device may include one or more control buttons, switches, or other selectable controls for controlling operation of the device.

Exemplary Digital Video Recording System

Figure 3:
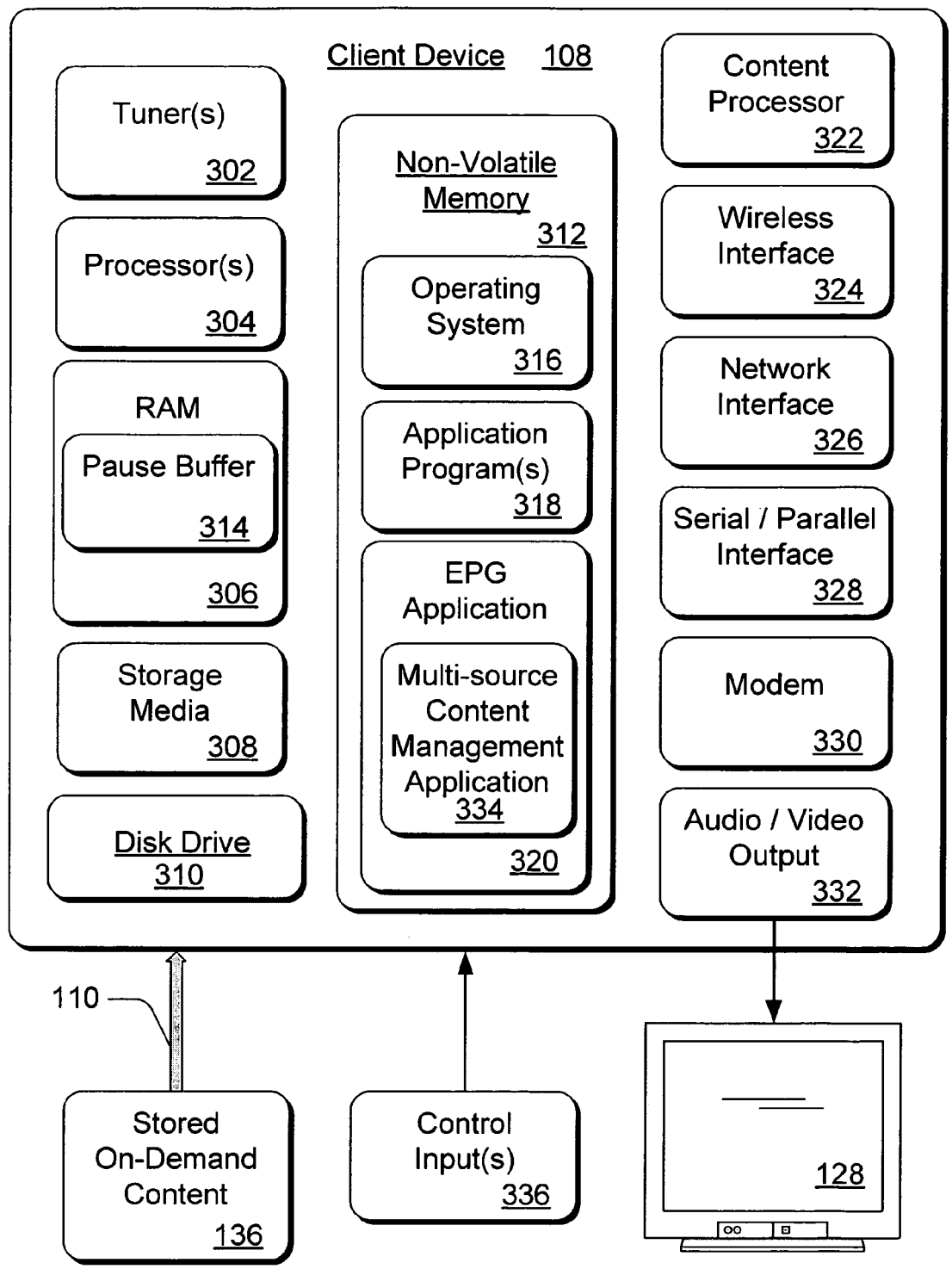
FIG. 3 illustrates an exemplary digital video recording system and related components in accordance with one embodiment.

FIG. 3 illustrates an exemplary digital video recording system 300 that includes selected components of television system 100, such as an exemplary client device 108 as shown in FIGS. 1 and 2, and a television 128. Client device 108 includes components to implement a digital video recording system and techniques to receive and process multi-source content, as will become apparent below.

Client device 108 includes one or more tuners 302 which are representative of one or more in-band tuners that tune to various frequencies or channels to receive television signals, as well as an out-of-band tuner that tunes to the broadcast channel over which the EPG data is broadcast to client device 108. Client device 108 also includes one or more processors 304 which process various instructions to control the operation of client device 108 and to communicate with other electronic and computing devices.

Client device 108 can be implemented with one or more memory components, examples of which include a random access memory (RAM) 306, a mass storage media 308, a disk drive 310, and a non-volatile memory 312 (e.g., ROM, Flash, EPROM, EEPROM, etc.). The memory components (e.g., RAM 306, storage media 308, disk drive 310, and non-volatile memory 312) store various information and/or data such as received content, EPG data, configuration information for client device 108, and/or graphical user interface information.

Further, in at least one embodiment, RAM 306 can include a portion of memory allocated as a short-term content buffer or pause buffer 314 which maintains segments of stored content 136 received via broadcast network 110. The short-term content buffer or pause buffer 314 maintains the most recent segment(s) of a broadcast program or segments of a received on-demand video.

An operating system 316 and one or more application programs 318 can be stored in non-volatile memory 312 and executed on a processor 304 to provide a runtime environment. A runtime environment facilitates extensibility of client device 108 by allowing various interfaces to be defined that, in turn, allow application programs 318 to interact with client device 108. The application programs 318 that may be implemented in client device 108 can include, without limitation, a browser to browse the Web (e.g., "World Wide Web"), an email program to facilitate electronic mail, a video recorder application or component to facilitate storing received content on disk drive 310 for example, and so on. An EPG application 320 is stored in memory 312 to operate on the EPG data and generate a program guide. Client device 108 can also include other components pertaining to a television entertainment system which are not illustrated in this example. For instance, client device 108 can include a user interface application and user interface lights, buttons, controls, and the like to facilitate viewer interaction with the device.

Client device 108 also includes a content processor and/or decoder 322 to process and decode a broadcast video signal, such as an NTSC, PAL, SECAM, or other TV system video signal. Content processor 322 can also include a video decoder and/or additional processors to receive, decode, and/or process video content received from content distribution system 106 (e.g., a network operator). For example, content processor 322 may include an MP3 or MPEG-2 (Moving Pictures Experts Group) decoder that decodes MPEG-encoded video and advertisement content. MPEG-2 supports a variety of audio/video formats, including legacy TV, HDTV (high-definition television), DVD (digital versatile disc), and five-channel surround sound.

Typically, video content includes video data and audio data that correspond to the video data. Content processor 322 generates video and/or display content that is formatted for display on display device 128, and generates decoded audio data that is formatted for broadcast by a broadcast device, such as one or more speakers (not shown) in display device 128. Content processor 322 can include a display controller (not shown) that processes the video and/or display content to display corresponding images on display device 128. A display controller can include a microcontroller, integrated circuit, and/or similar video processing component to process the images. It is to be appreciated that the systems and methods described herein can be implemented for any type of encoding format as well as for data and/or content streams that are not encoded.

Client device 108 further includes a wireless interface 324, a network interface 326, a serial and/or parallel interface 328, and a modem 330. Wireless interface 324 allows client device 108 to receive input commands and other information from a user-operated input device, such as from a remote control device or from another IR, Bluetooth, or similar RF input device.

Network interface 326 and serial and/or parallel interface 328 allows client device 108 to interact and communicate with other electronic and computing devices via various communication links. Although not shown, client device 108 may also include other types of data communication interfaces to communicate with other devices. Modem 330 allows client device 108 to communicate with other electronic and computing devices via a conventional telephone line. Client device 108 also includes an audio and/or video output 332 that provides signals to television 128 or to other devices that process and/or display, or otherwise render, the audio and video data.

Client device 108 includes, as part of the EPG application 320, a multi-source content management application 334 that receives and processes multi-source content, as will become apparent below. The multi-source content management application 334 can be implemented as a software component that executes on a processor 304 and is stored in non-volatile memory 312. The multi-source content management application 334 can also receive viewer commands as control inputs 336, such as from viewer-operated remote control device 204, handheld device 206, and/or keyboard 208. The viewer-inputs can include video display commands such as record, fast-forward, rewind, pause, and the like. The input commands may be input via an RF, IR, Bluetooth, or similar communication link or other mode of transmission to communicate with multi-source content management application 334.

Although shown separately, some of the components of client device 108 may be implemented in an application specific integrated circuit (ASIC). Additionally, a system bus (not shown) typically connects the various components within client device 108. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Exemplary Merging Algorithm

Before describing an exemplary merging algorithm, consider the following preliminary discussion. First, consider that there are multiple ways for a viewer to browse services. One way is to navigate within the electronic program guide (e.g. the presented grid), select a specific service and tune to it. Another way is to "channel up" or "channel down" from a particular program to browse specific adjacent channel numbers. Various techniques described below can be used with each of these browsing paradigms, as will become apparent.

In addition, consider the following on tuner dynamics. As noted above, a client device may have more than one tuner. In addition, individual tuners may be connected, via their associated inputs, to different sources (e.g. analog cable, digital cable, satellite, antenna and the like). For example, a single tuner may be connected to an antenna source and a cable source. In this case, the client device can only tune to (and record) one program at a time. If a client device has, for example, two tuners one of which is connected to an antenna source, the other of which is connected to a cable source, then the client device can record programs from each source at the same time. This tuner configuration is also referred to as a heterogeneous configuration.

Figure 4:
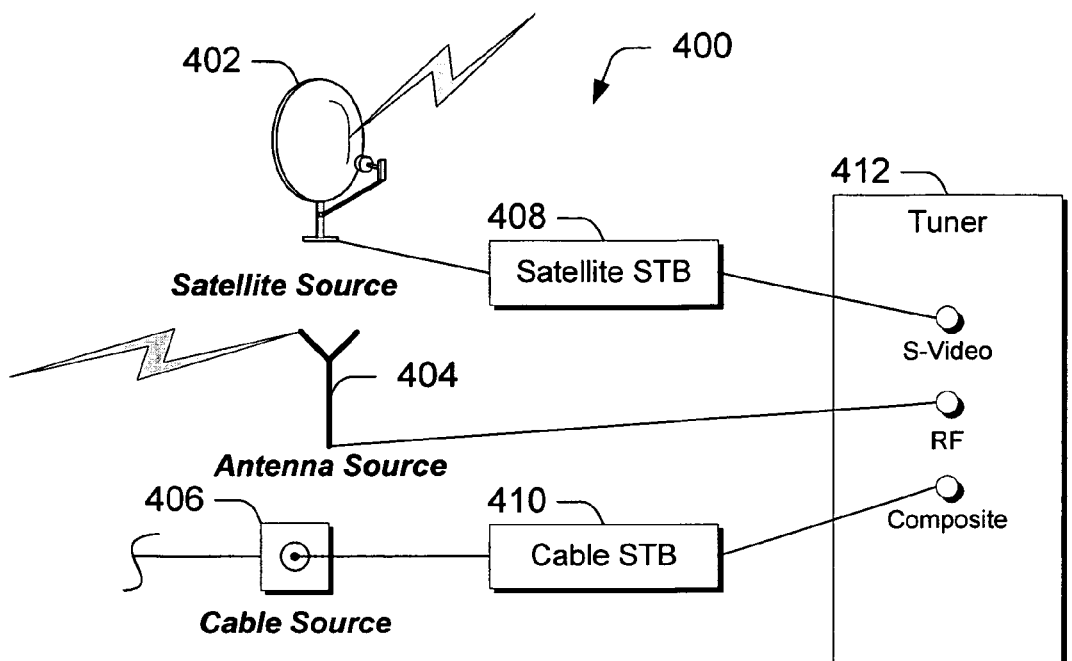
FIG. 4 illustrates one exemplary tuner environment in which the various embodiments can be employed.

As an example, consider FIG. 4 which illustrates one exemplary tuner environment generally at 400. Tuner environment 400 includes, in this example, three different sources, i.e. satellite source 402, antenna source 404 and cable source 406. Satellite source 402 is connected to a satellite set top box (STB) 408 which, in turn, is connected to the S-Video input of tuner 412. Cable source 406 is connected to a digital cable STB 410 which, in turn, is connected to the composite input of tuner 412. Antenna source 404 is connected to an RF input of tuner 412. As will be appreciated by the skilled artisan, tuner 412 can tune directly to antenna source, while tuning to the satellite and cable sources takes place, respectively, through each source's STB. In one embodiment, the source STB can be controlled via an IR connection or through a serial cable connection.

Figure 5:
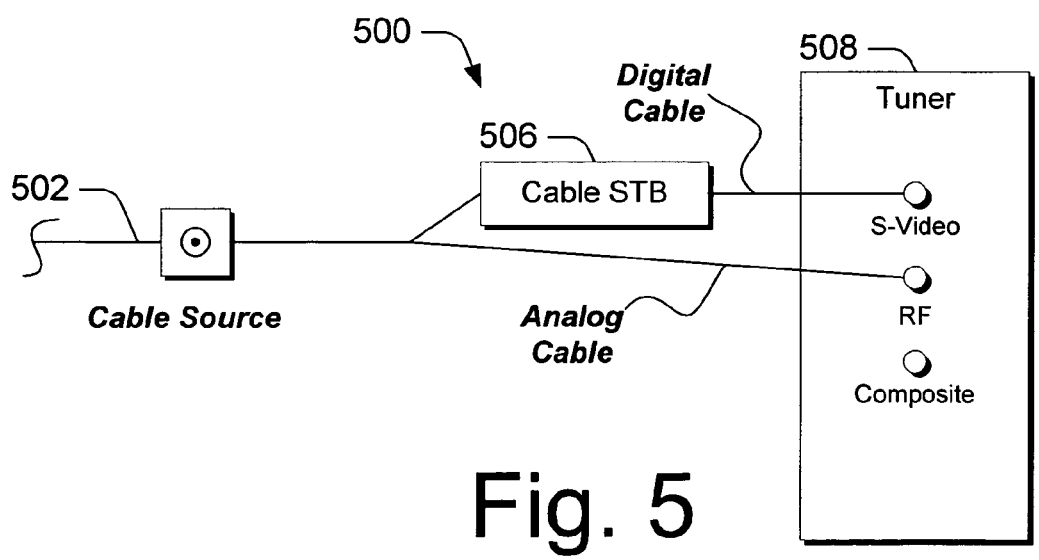
FIG. 5 illustrates another exemplary tuner environment in which the various embodiments can be employed.

As another example, consider FIG. 5 which illustrates one exemplary tuner environment generally at 500. Tuner environment 500 includes, in this example, two different sources 502—a digital cable source and an analog cable source. In this environment, the digital component of the cable source is provided to a digital STB 506 which, in turn, is connected to the S-Video input of tuner 508. The analog component of the cable source is connected to the RF input of tuner 508.

Given the examples of FIGS. 4 and 5, one can appreciate that for any one tuner, there can be multiple inputs each of which can be connected with a different source. Each different source can be associated with different content providers and the individual content providers can and typically do have different lineups. With multiple tuners, the situation becomes even more complicated because different sets of content providers can be associated with and connected to the same inputs on the different tuners.

Having multiple different lineups from the different content providers, as well as, in at least some instances, multiple different tuners, presents a problem insofar as efficiently managing the viewer experience in terms of their electronic program guide navigation, channel management and/or program consumption (e.g. viewing and/or scheduling and recording).

Merging Services from Different Inputs

Figure 6:
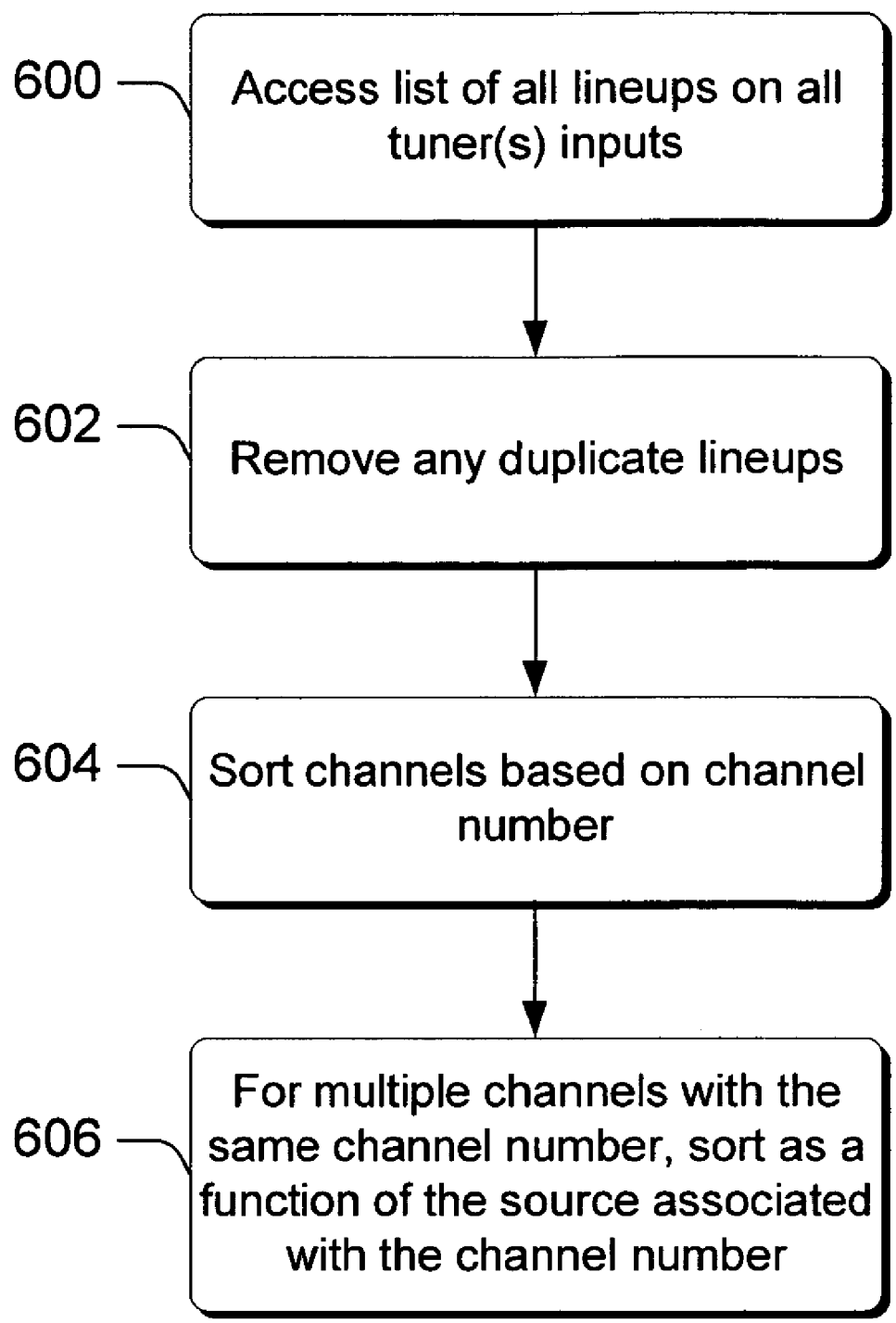
FIG. 6 is a flow diagram that describes steps in a service merging method in accordance with one embodiment.

FIG. 6 is a flow diagram that describes steps in a service merging method in accordance with one embodiment. The method is directed to acquiring multiple different lineups and merging the services of the lineups in a manner that presents to a viewer, an intelligently arranged collection of browsable services. Specifically, the method processes and combines or merges services from different tuner inputs in order to enable access to all services while providing an efficient viewer experience.

The method can be implemented in connection with any suitable hardware, software, firmware or combination thereof. In but one embodiment, the method can be implemented by an electronic program guide application, such as application 320 (FIG. 3).

At block 600, the method accesses a list of all lineups on all tuner inputs. In the example of FIG. 4, there might be four lineups—one from the satellite source, one from the antenna source, and two from the cable source (i.e. an analog lineup and a digital lineup). In the example of FIG. 5, there would be two lineups—one for the analog cable and one for the digital cable. Additionally, in cases wherein there is more than one tuner (e.g. two or more), the method accesses the lineups on all of the multiple tuners' inputs.

Once all of the lineups have been accessed, the method removes, at block 602, any duplicate lineups. That is, if the same lineup appears on multiple inputs and/or multiple tuners, then the method keeps only one of the lineups. For example, if one antenna source is connected to both tuners, then this would generate identical lineups on the two different tuners. In this case, only one of the lineups would be kept.

In accordance with one embodiment, an assumption is made with regards to analog cable and digital cable lineups. Specifically, if both lineups are present (as, for example, in the example of FIG. 5), then it is assumed that the analog cable lineup is a subset of the digital cable lineup. This being the case, in this particular embodiment, only the digital cable lineup is downloaded and kept. By doing so, time and resources are conserved.

The method now proceeds to develop and maintain one channel list in which the channel lineups are merged to provide a combination of all services. Specifically, in the illustrated and described embodiment, the method sorts channels, at block 604, based on the channel number. If there are occurrences of the same channel number on different lineups, all of the corresponding channels are kept in the sort. For example, channel 2 may be available from the lineup associated with the antenna source, as well as the lineup associated with a cable source. In this case, both channel 2s are kept.

For multiple channels with the same channel number, the method sorts the channels, at block 606, as a function of the source associated with the channel number. In the illustrated and described embodiment, this sort arranges channels with the same channel number in the following order: cable, antenna and satellite. Thus, if there are three channel 2s from the above-three sources, the sorted order of the channels would be: channel 2 (cable), channel 2 (antenna) and channel 2 (satellite).

Accordingly, the above-described method sorts first by channel number and then second, by the type of source associated with the channel number. This has the effect of interleaving services so that the same channel numbers emanating from different sources appear together in the electronic program guide that is presented to the viewer.

Table 1, presented just below, illustrates a portion of an exemplary lineup having merged services as discussed above.

TABLE 1

| Channel Number | Source | Call Letters |
| --- | --- | --- |
| 2 | Antenna | NBC |
| 2 | Satellite | NBC |
| 3 | Antenna | ABC |
| 3 | Satellite | ABC |
| 4 | Antenna | KRON |
| 4 | Satellite | KQED |

Notice in this example that each channel number is duplicated, and each duplicate channel number is associated with a different source—e.g., either an antenna source (which might be connected to the tuner's RF input) or a satellite source (which might be connected through a satellite STB to the tuner's S-Video input).

Having described an inventive merging algorithm, the discussion that follows describes how the inventive merged lineup can be utilized by the client device.

The Electronic Program Guide Application and Tuning Functionality

As noted above, the electronic program guide application helps viewers navigate and tune to a particular channel. The guide application presents a user interface in the form of an electronic program guide (such as a grid) to a viewer. Each line of the grid is associated with a service and, for each service, all of the programs for the service are listed. In the illustrated and described embodiment, the guide application presents not only the channel numbers associated with a service and the programs offered through the service, but the source associated with each particular service.

Figures 7, 8:
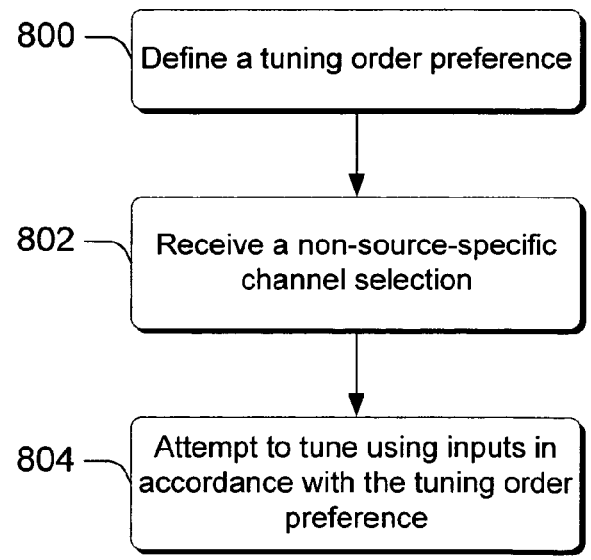
FIG. 7 illustrates an exemplary electronic program guide in accordance with one embodiment.
FIG. 8 is a flow diagram that describes steps in a tuning method in accordance with one embodiment.

As an example, consider the electronic program guide shown in FIG. 7 at 700. Notice for each channel number, there appears the call sign of the channel, as well as a parenthetical indication of the source—i.e. "(Ant)" for antenna, and "(Sat)" for satellite. Hence, a viewer can ascertain at glance not only the channels available for selection, but the source of the particular channels as well.

Now that the electronic program guide is displayed, the viewer can access a listing of the services of the guide by either paging up or down through the guide, or by entering a channel number associated with a particular service.

When the viewer enters a channel number, the guide application navigates to display the line that contains the specifically-requested channel (if there is a corresponding service associated with that channel number). As there may be more than one line (i.e. more than one service) that corresponds to a particular channel number, the guide application displays the appropriate number of lines in the grid. For example, in the EPG of FIG. 7, if the viewer enters a "3", the guide application navigates to display the first line of the grid of the service associated with channel 3—in this case, channel 3 (Ant). Following this line, the line that corresponds to the next channel 3 appears—in this case, channel 3 (Sat), and so on.

If the viewer enters a channel number for which a service is unavailable, the guide application navigates to the closest lower channel number and begins the grid display with a line that corresponds to that service. For example, if the viewer enters a "5" and there is no service associated with channel 5, the guide application will navigate to channel 4 and begin the grid presentation with the services that correspond to channel 4 and up.

Assume now that the viewer wishes to select a particular channel for viewing from the electronic program guide. In this case, the viewer might highlight the program and click "OK" on the remote control. In this particular example, the viewer specifies, through their selection via the electronic program guide, not only the channel number, but the associated source as well.

Responsive to selecting a particular program on a particular channel, the client device iterates through the list of all inputs linked to that particular line in the electronic program guide and tries to tune to each one. For example, assume the viewer selects channel 2 (cable). In this case, all of the inputs (e.g. RF and S-Video) that are connected to the analog cable source are iterated through and tuning on each is attempted. In the event that the system cannot tune to any of the inputs, a notification window will be displayed for the viewer. This situation can arise if, for example, the tuner is busy recording from another channel and has to remain on that channel to complete the recording.

In the event that there is both an analog cable input (with no STB) and a digital cable input (with a STB), recall that in some instances one line in the guide will represent both. In this particular situation, the client device will attempt to tune first without the STB (i.e. it will attempt to tune to the analog cable source first) and, if unsuccessful, will attempt to tune to the digital cable source (through the digital cable STB).

Now assume that instead of selecting a particular channel number through the electronic program guide, the viewer instead selects a channel while viewing a program—that is, independent of presentation of the electronic program guide. This can take place in a couple of different ways. First, a viewer may simply enter a channel number while watching a particular program. For example, if the viewer is watching a program on channel 4, they may wish to tune to channel 12 and hence, enter "12" on their remote control. Alternately, the viewer may "channel up" or "channel down" from their present channel.

In the context of the inventive merged lineup discussed above, these operations take on a form that departs from the conventional tuning paradigm.

Consider first the situation in which the viewer enters a specific channel number which is non-specific as to any one particular source. In this case, the associated service can be available through a specific tuner, or through multiple tuners. The service may also be available via an analog or digital connection.

When a viewer makes a non-source-specific channel selection, the system will attempt to tune to that particular channel using all appropriate inputs according to a predefined source order. In the illustrated and described embodiment, the predefined tuning order preference first attempts to tune to the analog cable source, then to the digital cable source, then to the antenna source, and then to the satellite source. In this example, the preference for attempting to tune to the analog cable source first pertains to the fact that there is a better tuning experience (i.e. tuning is quicker) with the analog tuning source than with the digital cable source.

FIG. 8 is a flow diagram that describes steps in a tuning method in accordance with one embodiment. The method can be implemented in connection with any suitable hardware, software, firmware or combination thereof. In but one embodiment, the method can be implemented by a system, such as the system shown and described in FIGS. 1-3.

The method defines, at block 800, a tuning order preference. Any suitable tuning order preference can be defined. One criterion that can be used to define the tuning order preference can be the speed at which tuning takes place. Another criterion that can be used could be the video quality associated with a particular source. Yet another criterion can be based upon user-provided preferences. For example, a user may provide or otherwise define a tuning order preference.

In one embodiment, the tuning order preference is defined in the following order: analog cable, digital cable, antenna and satellite.

At block 802, the method receives a non-source-specific channel selection. In the illustrated and described embodiment, the non-source-specific channel selection occurs by a viewer entering a channel number by, for example, their remote control. At block 804, the method attempts to tune to the specific channel number using inputs in accordance with the tuning order preference. In the specific example above, the method will first look to see if the channel is available from any of the inputs associated with the analog cable source, then the digital cable source, then antenna source, and finally the satellite source.

In the event that the system cannot tune to a particular channel using any of the inputs, a notification will be generated for the viewer. In the event that the tuner through which channel can be tuned is busy, the viewer will be presented with a notification window. For example, if the tuner through which the channel can be tuned is busy recording a program, but would otherwise be available for tuning to the requested channel, a notification window can be presented to the viewer to give them a choice of continuing the recording, or tuning to their requested program.

Consider now the situation in which the viewer channels up or down from a current channel.

First, consider the channel up case in the context of the FIG. 7 lineup. In this case, a viewer is watching a program on one channel and channels up to the next higher channel. When a viewer executes a channel up operation, the inventive method tunes to a channel associated with the next different service. A "different service" can be considered as one that has either a different channel number or different call letters. In the example lineup of FIG. 7, assume that the viewer is currently watching channel 4 (KRON) and channels up. The next higher channel is channel 4 (KQED). Even though this channel has the same channel number, its call letters are different. As such, it constitutes a different service and, accordingly, the method tunes to this channel. Assume further that the viewer is instead watching a program on channel 2 (Ant) and channels up. The next higher channel is channel 2 (Sat). In this case, however, the call letters—NBC—are the same as between the two channels. As such, the inventive method skips channel 2 (Sat) and instead tunes to channel 3 (Ant).

In the event the next different service is not tunable, a notification window is presented to the viewer for conflict resolution.

Figure 9:
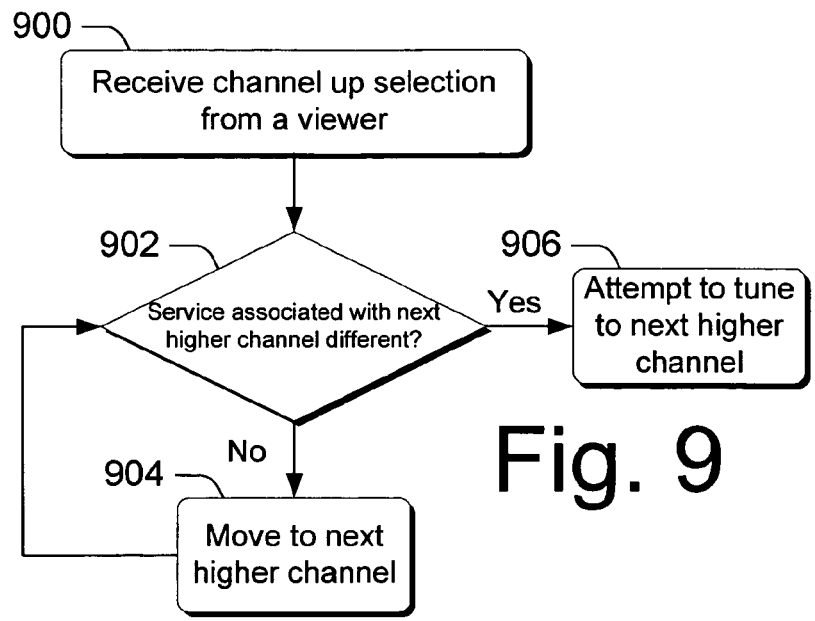
FIG. 9 is a flow diagram that describes steps in a channel up method in accordance with one embodiment.

FIG. 9 is a flow diagram that describes steps in a channel up method in accordance with one embodiment. The method can be implemented in connection with any suitable hardware, software, firmware or combination thereof. In but one embodiment, the method can be implemented by a system, such as the system shown and described in FIGS. 1-3.

The method, at block 900, receives a channel up selection from a viewer. In the illustrated and described embodiment, the channel up selection is received independent of presentation of the electronic program guide, such as while the viewer is currently watching a program. Block 902 ascertains whether the service associated with the next higher channel is different. Any suitable criteria can be used. In the example provided above, a service is considered as different if it either has a different channel number or different call letters. If the service is not different, block 904 moves to the next higher channel and returns to block 902. If, on the other hand, the service associated with the next higher channel is different, then block 906 attempts to tune to the next higher channel.

If attempts to tune to the next higher channel are unsuccessful, as by the tuner(s) through which tuning is attempted being busy, then a notification window can be presented to the viewer.

Figure 10:
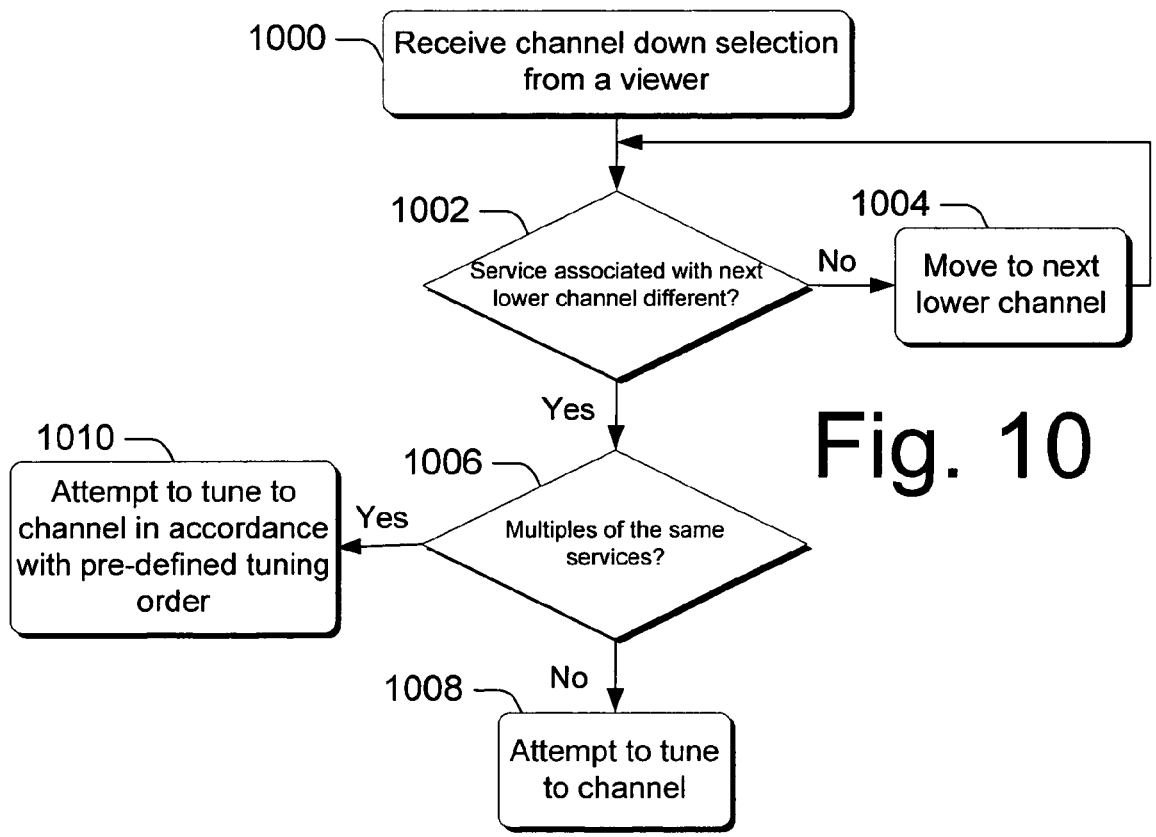
FIG. 10 is a flow diagram that describes steps in a channel down method in accordance with one embodiment.

Now consider the channel down case in connection with FIG. 10, which is a flow diagram that describes steps in a channel down method in accordance with one embodiment. The method can be implemented in connection with any suitable hardware, software, firmware or combination thereof. In but one embodiment, the method can be implemented by a system, such as the system shown and described in FIGS. 1-3.

The method receives, at block 1000, a channel down selection from a viewer. At block 1002, the method ascertains whether the service associated with the next lower channel is different. One manner of defining a "different" service is provided above. If the service associated with the next lower channel is not different, then block 1004 moves to the next lower channel and returns to block 1002. If the service associated with the next lower channel is different, then the method ascertains, at block 1006, whether there are multiples of the same service. If there are not multiples of the same service, then the method attempts to tune to that channel. If, on the other hand, there are multiples of the same service, the method attempts to tune to a channel, associated with that service, in a pre-defined tuning order. One example of a tuning order is given above.

For example, using the FIG. 7 lineup, assume that the viewer is currently on Channel 4 (Sat) and executes a channel down using their remote control. In this case, the method described above would first ascertain whether the service associated with the next lower channel is different (block 1002). In this case, the next lower channel is Channel 4 (Ant) and, by virtue of having a different call sign, is a different service. Accordingly, in this example, the system would (in the event of no multiples of the service associated with this channel), attempt to tune to Channel 4 (Ant). Assume further now that the viewer again executes a channel down from here. The method first ascertains whether the service associated with the next lower channel is different (block 1002). In this case, the next lower channel is Channel 3 (Sat) and is indeed associated with a different service. The method now ascertains (block 1006) whether there are multiples of the same service. In this case, Channel 3 (Ant) is, by virtue of the definition given above, considered the same service. As such, block 1010 attempts to tune to Channel 3 in accordance with a pre-defined tuning order. In the example of FIG. 8, this pre-defined tuning order is as follows: analog cable, digital cable, antenna and satellite. Accordingly, in this example, the method would first attempt to tune to Channel 3 (Ant).

EPG Download

Having multiple lineups and being able to merge them on the client device side means that the client device has to download the appropriate lineups for processing. In most instances, the EPG data resides in files that can be quite large. In order to reduce the processing overhead associated with downloading multiple lineups, various embodiments can put in place efficient measures. For example, in the case of analog and digital cable sources, the system first checks to ascertain whether the analog lineup is a subset of the digital lineup. If it is, then only the digital lineup is downloaded. In the event that the analog lineup is not a subset of the digital lineup, then, in one embodiment, an error message is presented to the viewer and the system uses only the digital lineup and ignores channels on the analog input. Alternately, the system could utilize incremental downloads. Thus, instead of downloading fourteen days worth of data, the system might only download the information related to the last day.

It is to be appreciated that both the analog and digital lineups can be downloaded in some embodiments.

Channel Filtering

In one embodiment, a channel filtering mechanism is provided to assist viewers in removing services that are presented in the guide. For example, if a viewer decides that they do not wish to view guide information associated with channels 2 or 10 or the content on channels 2 or 10, then the viewer can opt to have the channel removed from the guide.

In one embodiment, a channel filtering user interface is presented to the viewer and includes not only a channel list, but an indication of the associated source as well. As an example, consider FIG. 11 which shows an exemplary channel filtering user interface 1100. There, the channel filtering user interface includes not only the channel list, but the associated source as well. For example, a user may decide that they do not wish to use Channel 2 (Ant) at all and may remove it from the lineup. As such, the system will not attempt to tune to Channel 2 (Ant). In addition, a user may experience problems in attempting to tune to Channel 2 (Ant). In this case, the user can remove Channel 2 (Ant) from the guide.

Default Lineup

In one embodiment, the system provides a user interface that enables the user to communicate the system configuration to the system in what is referred to as a "first time user experience". By informing of the system of the particular configuration that the user has chosen, the system can then select a default lineup that is appropriate for the user's specifically-configured system.

More specifically, when the system is initially set up, the system can present the user with a user interface that queries the user as to which tuner inputs are connected to which sources on each tuner.

For example, if the user has the antenna source attached to "Tuner 1", then the default lineup may consist of a particular group of channels, such as channels e.g. 2-85. If, on the other hand, the user has connected both digital and analog cable to "Tuner 1", then a different default lineup, such as channels 2-999 digital, may be selected. By ascertaining which sources are connected to the tuner(s), the system can intelligently present a lineup that is appropriate for the configuration.

In some embodiments, the user can provide even more specific information about the system's configuration. For example, when queried, the user might inform the system that the antenna source is connected to RF input 1 of "Tuner 1", and that the satellite STB is connected to S-Video input 2.

Once the system knows the particular configuration that the user has selected, the system can then download the appropriate EPG information and incorporate that information into an electronic program guide, as described above, for presentation to the viewer. By knowing the system's particular configuration, efficiencies are enhanced in that the system need not download unnecessary EPG information. For example, if the system does not have a satellite connection, then it is not necessary to download any lineup information associated with the satellite source.

Video Input

In one embodiment, the user is provided with an opportunity to connect one or more additional sources to the tuner(s), and have the additional sources reflected in the electronic program guide. In this particular embodiment, the additional sources can comprise one or more generic video sources such as a camcorder, digital camera, closed circuit camera, a VCR and the like. The generic video source can be connected, for example, to the S-Video input or to the composite video input. When so connected, the electronic program guide presents additional lines in the grid that are dedicated to the additional generic sources.

As an example, consider FIG. 12 which shows an exemplary electronic program guide at 1200. There, the last two lines of the guide are dedicated to the generic video sources that can be connected with the tuner(s). Here, the "call letters" for the sources are simply "Video 1" and "Video 2". In addition, there is no EGP information that is inserted into the various cells of each line.

By incorporating the generic video sources into the electronic program guide, the viewer can tune to these particular sources using the electronic program guide. In one embodiment, the only way that a viewer can tune to these generic sources is through the electronic program guide. As such, channeling up or down through these channels will skip the channels.

In addition, the generic video inputs can appear in the channel filtering screen as well.

Scheduling/Recording in Homogeneous/Heterogeneous Tuning Environments

In various embodiments, the processes and methods that are described above can be implemented in both single tuner and multiple tuner environments, as well as single and multiple tuner environments that are either homogeneous or heterogeneous.

Recall that homogeneous tuner environments are those in which all tuners are connected to the same sources. So, for example, in the single two-input tuner environment, this means that there is one source per tuner, and the sources are identical. In the multiple tuner environment where each tuner has, for example, two inputs, this means that there are two sources per tuner and that the sources on the first tuner are the same as the sources on the second tuner.

Heterogeneous tuner environments, on the other hand, refer to tuner environments in which all tuners are not connected to the same sources. So, for example, in the single two-input tuner environment, this means that there are two sources for the tuner and each source is different—e.g. a satellite source connected to one tuner input, and an antenna source connected to the other tuner input. In the multiple tuner environment where each tuner has, for example, two inputs, this means that there are one or more sources per tuner and the sources are not identical—e.g. satellite source and antenna source connected to the first tuner, and analog cable connected to the second tuner.

Processing with regards to the lineup merging algorithm described above and, more generally, with regards to all of the processing techniques described in the section entitled "The Electronic Program Guide Application and Tuning Functionality" can be conducted in same manner regardless of the tuning environment.

The following discussion, which pertains to scheduling and recording programs, is directed to a tuning environment in which there is more than one tuner (i.e. two or more) available to the client device.

When a viewer wishes to schedule a program for recording, there are generally two choices that can be made with regards to scheduling a particular tuner. First, the tuner that is to be used for recording can be scheduled at the time the viewer schedules the program for recording—referred to as "scheduling time". Alternately, the tuner can be scheduled for recording at a time that is closer to the actual broadcast of the program—referred to as "recording time".

If a tuner is scheduled for recording at scheduling time, there is a greater possibility for a conflict in the future. Specifically, if a viewer happens to be watching a program that is using the scheduled tuner at record time, then the viewer will likely be tuned away from their program, even though there may be a free tuner in the background. In many instances, this is not a desirable approach.

Alternately, as noted above, the system can choose to assign tuners at or near record time. When this approach is taken, consideration should be given to which content is available through which tuners.

In accordance with one embodiment, the following process is utilized to schedule recordings in tuning environments with more than one tuner. First, if a particular channel on which a program is to be recorded can only be handled by one tuner in the system, then this tuner is assigned to the particular recording, and to any upcoming recording that overlaps with this one at schedule time. Thus, if recording A needs a certain tuner, and overlaps with recordings B and C, then the certain tuner is scheduled for recording at schedule time.

Second, if a particular channel on which a program is to be recorded can be handled by either or any tuner, then the tuner for the recording is selected as close to record time as possible. If, however, the recording overlaps with another recording that needs that particular tuner, then the system, possibly in cooperation with the viewer, will need to make a decision as to which tuner to use for the recording that is to be scheduled.

In the case of a conflict, a notification window can be presented to a viewer (if present), so that the viewer can provide their input to facilitate the conflict resolution. For example, if a viewer is watching a program that utilizes a tuner that is needed for a scheduled recording, a notification window can be presented which allows the viewer to assent to being tuned away from their program.

As an example, consider that a viewer wishes to record an HBO program and that only one of their system's tuners has HBO available. In this case, the system selects that tuner for recording the HBO program at schedule time. Otherwise, if the user wishes to record a program from a source to which both tuners can tune, the system will wait to schedule a tuner until record time.

CONCLUSION

Various embodiments described above provide methods and systems for providing multi-source content in electronic program guides (EPGs). In at least some embodiments, various techniques can present the viewer with a user interface, such as a grid, that is efficiently and intelligently assembled and managed to foster a desirable user experience. In some embodiments, multiple sources are merged in an intelligent way, and presented in one user interface. Merging sources as described above removes duplication, such as in the case of sources of the same providers (e.g. analog cable and digital cable). In addition, the source of content in the EPG is presented to help the viewer better understand the information that is presented on their screen. Further, various embodiments can enable a viewer to intelligently browse different channels while watching live television in a way that skips duplicate channels on different sources. Moreover, an intelligent tuning algorithm facilitates faster tuning so that content can be acquired by the viewer in a more expedient fashion. Further embodiments can provide a default lineup system that enables the user to browse multiple sources of media without EPG information. Still further embodiments support scheduling and/or recording in various homogeneous and heterogeneous tuner environments.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
   accessing a list of all lineups available on one or more inputs of one or more tuners;
   removing any duplicate lineups;
   sorting channels of the lineups based on the channel number and retaining occurrences of the same channel number from different sources;
   for any channels with the same channel number, sorting the same channel numbers as a function of the source associated with the channel number effective to provide a merged lineup;
   receiving a viewer channel selection independent of presentation of an electronic program guide associated with the merged lineup;
   determining whether a next channel being transitioned to by the channel selection shares a channel number and call letters with a current channel being transitioned from by the channel selection; and
   in response to determining that the next channel shares the channel number and call letters of the current channel, skipping the next channel and transitioning to another channel following or preceding the next channel in the merged lineup.

2. The method of claim 1 further comprising, in an event that lineups are available from both an analog cable source and a digital cable source, retaining only the lineup associated with the digital cable source.

3. The method of claim 1, wherein the act of sorting the same channel number comprises arranging the same channel numbers in the following source order: cable, antenna and satellite.

4. The method of claim 1 further comprising presenting an electronic program guide that embodies the merged lineup.

5. The method of claim 1 further comprising presenting an electronic program guide that embodies the merged lineup, wherein the act of presenting comprises presenting indicia of the source associated with individual services of the merged lineup.

6. The method of claim 1 further comprising presenting an electronic program guide that embodies the merged lineup, and further comprising:
   receiving a viewer channel selection from the electronic program guide;
   iterating through tuner inputs associated with the viewer channel selection; and
   attempting to tune to the viewer channel selection.

7. The method of claim 1 further comprising presenting an electronic program guide that embodies the merged lineup, and further comprising presenting, in the electronic program guide, one or more entries associated with one or more generic video sources.

8. The method of claim 1 further comprising, responsive to receiving the channel selection, attempting to tune to the channel using a predefined tuning source order.

9. The method of claim 1 further comprising, responsive to receiving the channel selection, attempting to tune to the channel using a predefined tuning source order, wherein the tuning source order is as follows: analog cable source, digital cable source, antenna source and satellite source.

10. The method of claim 1 further comprising, in an event the viewer channel selection is a channel up, attempting to tune to the next higher channel with a different service.

11. The method of claim 1 further comprising, in an event the viewer channel selection is a channel down, then attempting to tune to a next lower channel with a different service.

12. The method of claim 1 further comprising, in an event the viewer channel selection is a channel down, then:
   ascertaining whether a service associated with the next lower channel is different and if so, and if there are no multiples of this service, attempting to tune to the next lower channel; and
   if there are multiples of this service, attempting to tune to an associated channel using a predefined tuning source order.

13. The method of claim 1 further comprising, in an event the viewer channel selection is a channel down, then:
   ascertaining whether a service associated with the next lower channel is different and if so, and if there are no multiples of this service, attempting to tune to the next lower channel; and
   if there are multiples of this service, attempting to tune to an associated channel using a predefined tuning source order wherein the tuning source order is as follows: analog cable source, digital cable source, antenna source and satellite source.

14. The method of claim 1 further comprising, ascertaining whether a first lineup is a subset of a second lineup and, if so, downloading only the second lineup.

15. The method of claim 1 further comprising, prior to accessing the list, presenting a user interface that queries a user as to which tuner inputs are connected to which sources and, responsively, selecting a default lineup based on which tuner inputs are connected to which sources.

16. The method of claim 1, wherein said acts are performed in connection with a single tuner environment.

17. The method of claim 1, wherein said acts are performed in connection with a multiple tuner environment.

18. One or more computer-readable storage media having computer-readable instructions thereon which, when executed, implement a method comprising:
   accessing a list of all lineups available on one or more inputs of one or more tuners;
   removing any duplicate lineups;
   sorting channels of the lineups based on the channel number and retaining occurrences of the same channel number from different sources;
   for any channels with the same channel number, sorting the same channel numbers as a function of the source associated with the channel number effective to provide a merged lineup, wherein the act of sorting the same channel number comprises arranging the same channel numbers in the following source order: cable, antenna and satellite;

presenting an electronic program guide that embodies the merged lineup;

receiving a viewer channel selection independent of presentation of the electronic program guide associated with the merged lineup;

determining whether a next channel being transitioned to by the channel selection shares a channel number and call letters with a current channel being transitioned from by the channel selection; and in response to determining that the next channel shares the channel number and call letters of the current channel, skipping the next channel and transitioning to another channel following or preceding the next channel in the merged lineup.

19. A client device embodying the one or more computer-readable storage media of claim 18.

* * * * *